UNITED STATES PATENT OFFICE.

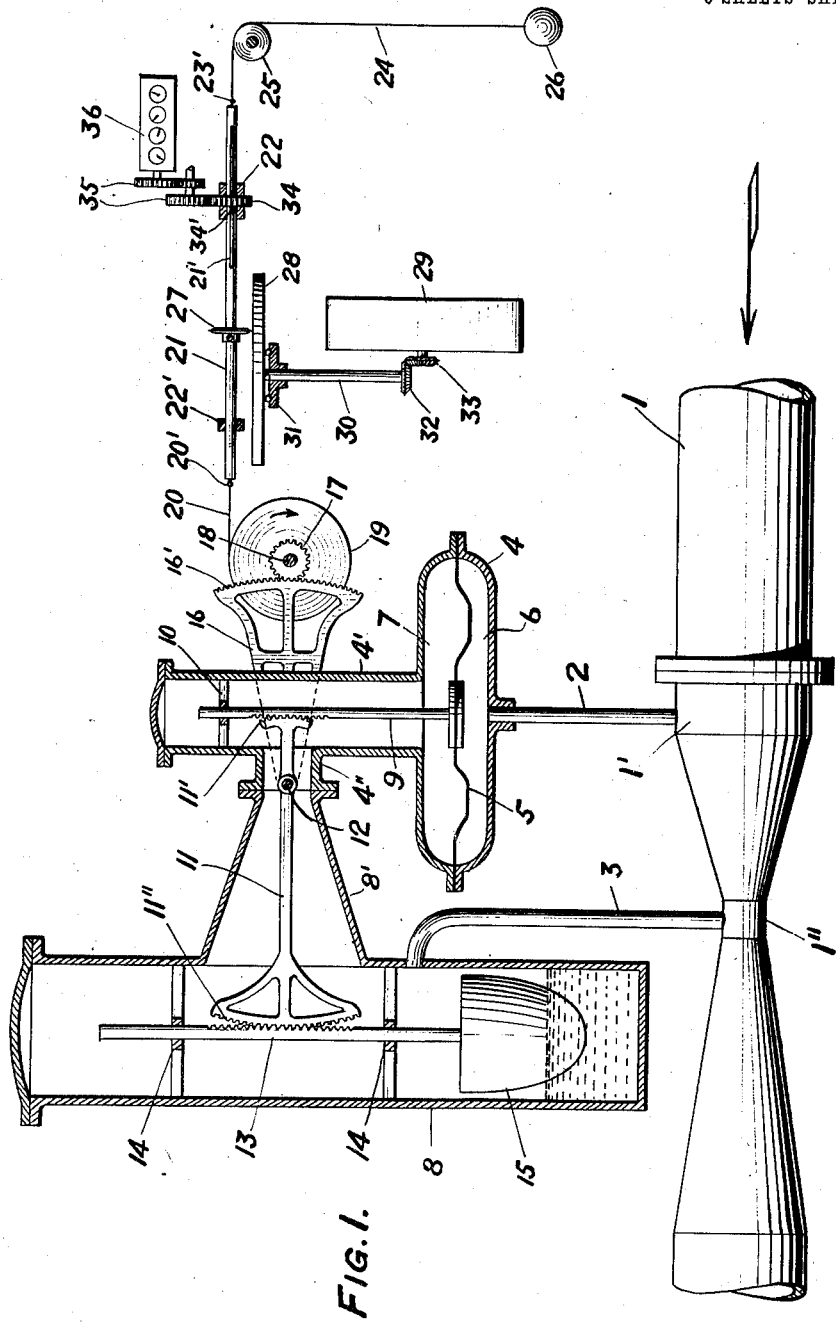

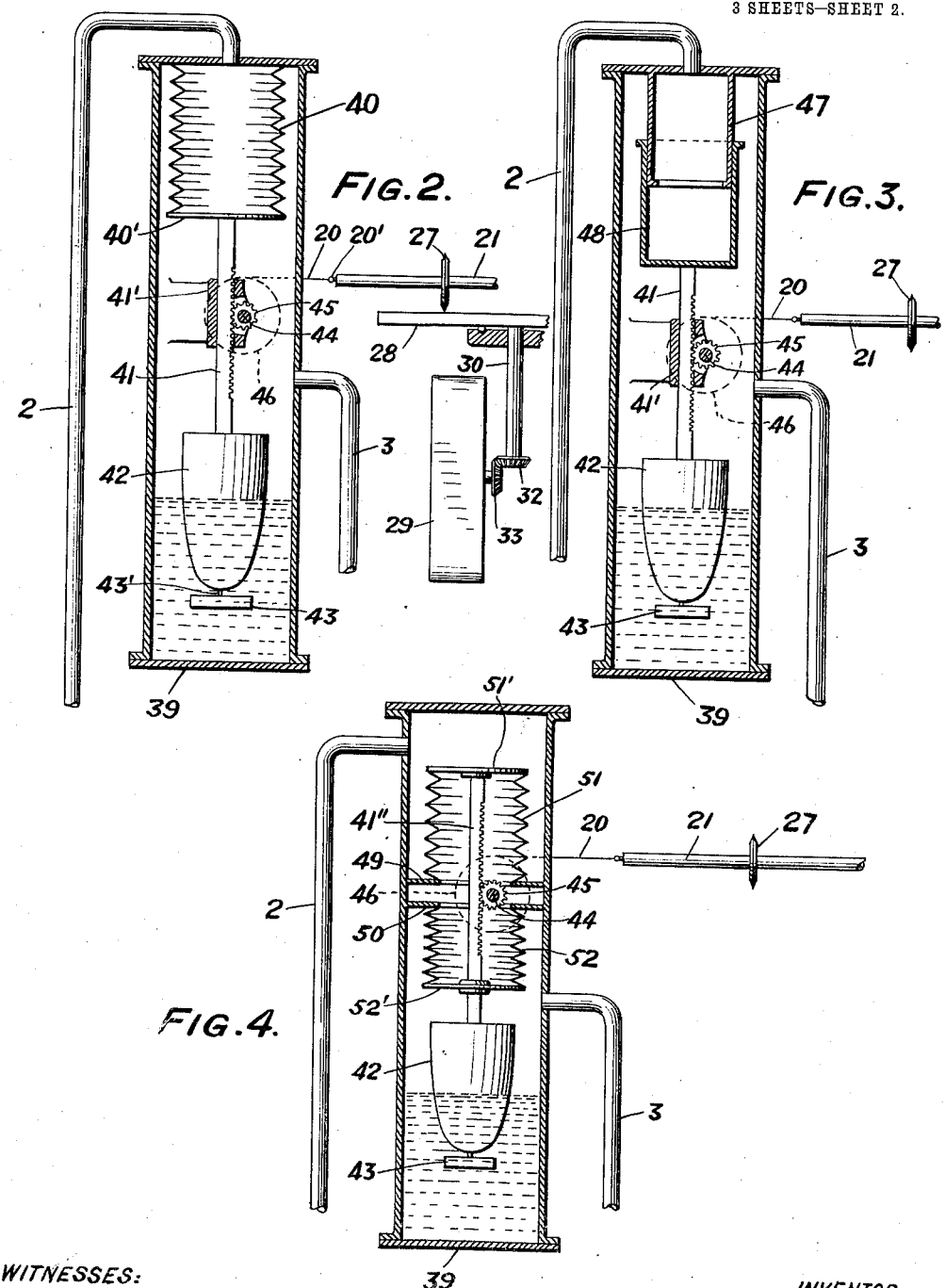

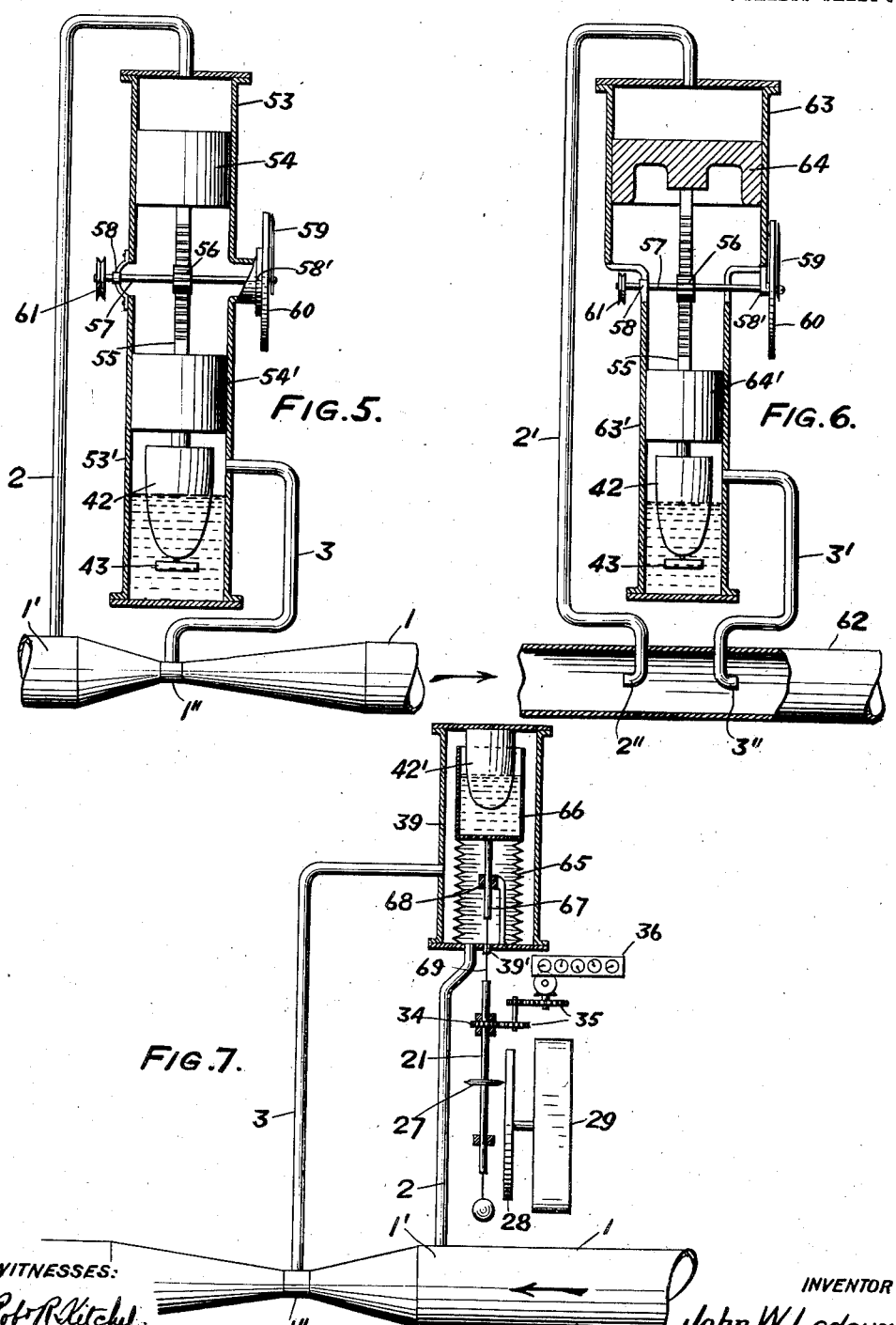

JOHN W. LEDOUX, OF SWARTHMORE, PENNSYLVANIA.

FLUID-METER.

1,043,115.  Specification of Letters Patent.  Patented Nov. 5, 1912.

Application filed January 28, 1910. Serial No. 540,563.

*To all whom it may concern:*

Be it known that I, JOHN W. LEDOUX, a citizen of the United States, residing at Swarthmore, in the county of Montgomery and State of Pennsylvania, have invented certain Improvements in Fluid-Meters, of which the following is a specification.

My invention is a fluid meter wherein differential pressures effect the movement of mechanism under control of liquid displacing means which regulate the movement, preferably to a simple proportion of the flow to be measured.

In the preferred construction, a diaphragm or piston, simple or compound, is moved by the resultant of pressures acting in opposite directions thereon and communicated from a conduit's normal and contracted sections respectively, from Pitot tubes, or other differential pressure mechanism. A tapered float or displacing device is immersed to a greater or less extent in liquid heavier than that to be measured, and a force equal to the weight of the displaced liquid is communicated to the diaphragm or piston, the displacing device being so shaped that it exerts a variable force regulating the movement so that it shall be a simple proportion of the flow to be measured. The movement thus regulated is translated and integrated by suitable indicating mechanism.

The features characteristic of my invention are disclosed in the following description and the accompanying drawings in illustration thereof.

In the drawings, Figure 1 is an elevation, partly in section, representing a form of my invention comprising a simple diaphragm connected with a peculiarly shaped float by means of a lever; Fig. 2 is a sectional elevation of a second form of my invention comprising a collapsible diaphragm having a piston head positively fixed to a float; Fig. 3 is a sectional elevation representing a form of the invention in which the float is positively connected with a hollow piston moving on a stationary cylinder; Fig. 4 is a sectional elevation representing a further modification in which the pressures are communicated to chambers separated by a compound collapsible diaphragm having piston heads positively fixed to a float and forming an intermediate chamber in which a connection is made with integrating mechanism; Fig. 5 is a sectional elevation representing a further modification of my invention which employs a compound piston having heads of the same area positively fixed to a float; Fig. 6 is a sectional elevation representing a further modification in which is employed a compound piston having heads with different areas positively connected to a float; and Fig. 7 is a sectional elevation in which is used a collapsible diaphragm having a float chamber movable therewith and coöperating with a stationary displacing device.

The invention, as illustrated in Fig. 1, is embodied in a construction comprising a conduit 1 having a pipe 2 connected with its normal section 1' and a pipe 3 connected with its contracted or Venturi section 1''. A casing member 4, having the extension 4' provided with the branch 4'', is divided by a simple diaphragm 5 into chambers 6 and 7, the pipe 2 connecting the conduit with the chamber 6. A casing member 8, having the branch 8' connected with the branch 4'', is connected by the pipe 3 with the conduit. A rack 9 in the part 4' is fixed to the diaphragm 5 and is reciprocated by the movements thereof in a guide way 10. This rack engages a segmental gear 11' on the short arm of a lever 11 which is fixed to a rock shaft 12 journaled in the walls of the part 4'', the lever extending through the parts 4'' and 8'. A segmental gear 11'' on the long arm of this lever engages a rack 13, which is movable in the guide ways 14 within the part 8, and has fixed thereto the peculiarly shaped float 15 immersed to a greater or less depth in a liquid, as mercury, contained in this compartment of the casing. The float is preferably shaped so that the weight of the mercury displaced thereby, and consequently the force acting thereon, bears such relation to the flow through the conduit that the movement of the float and the flow in the conduit shall maintain a constant relation.

An arm 16 is fixed to the shaft 12 exterior to the casing 4'' and is provided with a segmental gear 16' which engages and revolves a pinion 17 carried by a shaft 18, the pinion having a sheave 19 fixed thereto and revolved therewith. A cord 20, fixed to and carried by the sheave, is connected by a swivel 20' with a rod 21 which is movable longitudinally through and revoluble in the bearings 22 and 22', the rod being connected by a swivel 23' with a cord 24 which passes over a sheave 25 and carries a weight 26. A wheel 27 is fixed on the shaft 21 and revolves the shaft by making contact with the surface of a disk 28 which is revolved at a constant rate by a clock 29; the disk being fixed on a shaft 30 journaled in the bearings 31 and having a beveled gear 32 thereon which engages a beveled gear 33 driven by the clock. The shaft 21 moves through a pinion 34 which is journaled in the bearing 22 and has fixed thereto a key 34′ engaging the groove 21′ of the shaft, whereby the gear is revolved. The gear 34 drives the gear train 35 which operates a register 36. When there is no flow through the conduit 1, the pressures communicated from the fluid therein, through the pipe 2 to the chamber 6 and through the pipe 3 (by way of the parts 8, 8′, 4″ and 4′) to the chamber 7, are equal. Hence the float 15 will stand at its highest elevation with its lowermost part touching the surface of the mercury and the intermediate mechanism will hold the wheel 27 at the center of the disk 28. In this position the shaft 21 is not revolved and the registering mechanism is inactive. As the flow through the conduit rises from zero to the maximum, the resultant pressure, being the difference between the pressures communicated through the pipes 2 and 3, causes the diaphragm 5 to rise and, through the intermediate mechanism, the float 15 to descend in the mercury a distance bearing a simple proportion to the flow in the conduit. This movement, communicated by the lever 11 through its connection with the racks 9 and 13, rocks the shaft 12 and the arm 16, whereby the pinion 17 and the sheave 19 are turned in the direction of the arrow thereon. The shaft 21 is thus permitted to move longitudinally by the action of the weight 26 through the cord 24 and the wheel 27 is moved a proportionate distance from the center toward the periphery of the disk 28. As the wheel moves from the center toward the periphery of the disk, its rate of revolution increases in the same ratio as does the volume of flow to be measured and the registering mechanism is caused to indicate this volume.

In the form of the invention illustrated in Fig. 2, the pipes 2 and 3 are connected with a casing 39. This casing has a collapsible diaphragm or hydrostatic bellows 40 fixed to the top thereof which separates the fluids communicated through the pipes, the pipe 3 being connected with a compartment exterior to and the pipe 2 being connected with a compartment within the bellows. The movable head 40′ of the bellows is connected by a rack 41, movable through the guide way 41′ in the casing, with a float 42 (similar to the float 15) immersed to a greater or less extent in mercury in the bottom of the casing. A buoying device 43 is attached by a slender connection 43′ to the float and as this device is constantly submerged its effect is constant. A shaft 44, journaled in the casing 39, has fixed thereon, within the casing, a pinion 45 which is engaged by the rack 41. Fixed on the shaft exterior to the casing is a sheave 46 which is connected by the cord 20 with the swivel 20′ of the longitudinally movable shaft 21. This shaft has fixed thereon the wheel 27 which is revolved by contact with the disk 28, the latter being constantly revolved from the clock 29 through the connections 30, 32 and 33, as previously described.

When the pressures communicated through the pipes 2 and 3 are equal, the float 42 rises (by reason of its buoyancy and that of the part 43) to its maximum height, when its apex touches the surface of the mercury, and the wheel 27 is brought to the center of the disk 28, in which position no motion is communicated to the shaft 31 from the clock. When the pressure communicated through the pipe 2 is greater than that communicated through the pipe 3, the greater pressure within the hydrostatic bellows expands the latter from its previously collapsed position, whereby the rack 41 and float 42 are moved downwardly a proportionate distance. The movement of the rack revolves the pinion 45 and the sheave 46 by which the wheel 27 is moved from the center toward the periphery of the disk 28. Consequently the shaft 21 is revolved to operate the register proportionately to the resultant pressure, which is a function of the rate of flow.

As shown in Fig. 3, the casing 39, having the pipes 2 and 3 connected therewith, has, within its top, a stationary cylinder 47 through which the pipe 2 communicates with the interior of a hollow piston 48 movable on the cylinder. The rack 41, movable in the guide way 41′, connects the head of the piston with the float 42 having a buoying device 43 connected with the apex thereof and constantly submerged in the mercury in the chamber, the buoying device lifting the float so that its apex touches the surface of the mercury when the pressures within and without the bellows are the same. As in the construction shown in Fig. 2, the rack revolves the shaft 44 by engagement with the pinion 45 fixed thereon, the shaft revolving the sheave 46 which acts through the parts 20 and 21 to translate the wheel 27.

As shown in Fig. 4, the casing 39, with which the pipes 2 and 3 are connected, contains the internal flanges 49 and 50 having the respective collapsible diaphragms or hydrostatic bellows 51 and 52 fixed thereto, the bellows being provided with the respective heads 51′ and 52′. A rack 41″, passing through the bellows, is fixed to their heads and to the float 42 which has connected therewith the buoying device 43 immersed in the mercury in the casing. When the pressures communicated through the pipes 2 and 3 are the same, the buoyancy of the device 43 holds the float 42 so that its apex is in contact with the surface of the mercury. As the pressure communicated through the tube 2 to the head 51' rises above the pressure communicated through the tube 3 to the head 52' the bellows 51 close and the bellows 52 expand, whereby the rack 41'' and the float 42 are carried downwardly against the gradually increasing resistance caused by the increasing submergence of the float in the mercury, the movement of the rack being communicated through the pinion 45, shaft 44, sheave 46, cord 20 and shaft 21 to the wheel 27.

As shown in Fig. 5, the conduit 1 has its normal section 1' connected by the pipe 2 with a chamber in the top of a cylindrical casing 53 and its contracted or Venturi section 1'' connected by the pipe 3 with a chamber in the lower part of the casing. A compound piston, comprising the similar heads 54 and 54' connected by the rack 55, reciprocates in the cylinder chambers between the connections of the pipes 2 and 3 therewith. The float 42, having the buoying device 43 attached to the apex thereof, is connected with the piston head 54'. The rack 55 engages a pinion 56 which is fixed on the shaft 57 journaled in bearings 58 and 58' supported by the cylinder. The shaft has fixed thereto a pointer 59 which is movable over a dial 60. A sheave 61, fixed to the shaft 57, is adapted for connection with the cord 20 (not shown) and the mechanism adjusted thereby. With equal pressures communicated through the pipes 2 and 3 to the heads 54 and 54', when there is no flow in the conduit, the mercury holds the reciprocating mechanism in the cylinder in the position of maximum elevation with the apex of the float touching the surface of the mercury. As the flow through the conduit gradually rises and the pressure communicated through the pipe 2 increases over that communicated through the pipe 3, the compound piston and the float are moved down, against the gradually increasing resistance offered by the mercury, and the rack 55 revolves the pinion 56 which acts through the shaft 57 to revolve the pointer 59 and sheave 61.

As shown in Fig. 6, the conduit 62 is connected by pipes 2' and 3' with the top and bottom respectively of a compound cylinder having sections 63 and 63', the pipes having oppositely disposed inlets 2'' and 3'' of the Pitot tube type. A compound piston has the differential heads 64 and 64' disposed in the respective cylinder sections 63 and 63' and connected by the rack 55; the head 64' having connected therewith the float 42 provided with a buoying device 43. The rack 55 engages the pinion 56 fixed on the journaled shaft 57, the latter being carried by the bearings 58 and 58' and having fixed thereto the pointer 59 movable over the dial 60 and the sheave 61 for connection with the cord 20 (not shown). When there is no flow in the conduit, the reciprocating mechanism within the cylinder is at its highest elevation, and when the liquid flows the resultant force due to the different pressures acting through the tubes 2' and 3' carries down the reciprocating mechanism as previously described.

As shown in Fig. 7, the conduit 1 has its normal section 1' connected by the tube 2 with the bottom of the casing 39 and its contracted or Venturi throat 1'' connected by the pipe 3 with the same casing. A hydrostatic bellows 65 is fixed to the bottom of the casing and has fixed on the head thereof the bottom of a vessel 66 adapted for containing mercury. A displacing device 42', having a contour analogous to that of the movable displacing device or float 42, is fixed to the top of the casing 39 and extends into the mercury vessel 66. The bottom of this vessel has fixed thereto a guide rod 67 which moves through a stationary bearing 68 fixed to the bottom of the casing. A cord or wire 69 extends through a stuffing box 39' in the bottom of the casing and connects the rod 67 with the rod 21 having the wheel 27 thereon, which is driven by the clock 29 through the disk 28 and drives the register 36 through the gears 34 and 35. When the flow in the conduit falls to zero, the vessel 66 falls to its lowermost position, where it may be supported by the bearing 68, the apex of the device 42' touching the surface of the mercury and the wheel 27 being at the center of the disk 28. With the liquid flowing through the conduit, as it rises from zero, the vessel 66 is elevated against the increasing resistance due to the increasing submergence of the displacing device 42' and the wheel 27 is moved proportionately from the center toward the periphery of the constantly revolving disk 28 so that, as previously described, the shaft 21 will be revolved and will act through the gears 34 and 35 upon a register 36, which will indicate the flow.

The apparatus provides, in the forms shown in Figs. 4, 5, and 6, means for excluding the liquid from the rotary transmission shafts 44 and 57, which are subject to atmospheric pressure, hence the necessity for using a stuffing box or the like is avoided.

It will be understood that the invention is characterized specifically, by reciprocating pressure actuated mechanism movable under control of a counterbalancing float designed so that the extent of movement shall be a definite proportion of the flow to be measured.

Having described my invention, I claim:

1. In a meter, a casing, reciprocating mechanism dividing said casing into several non-communicating chambers, means whereby oppositely acting fluid pressures are communicated through said chambers to said mechanism, and a float connected with said mechanism and adapted to be immersed to a greater or less degree in a liquid by the movement of said mechanism due to variations in the resultant pressure acting thereon.

2. In a meter, a casing, reciprocating mechanism dividing said casing into several non-communicating chambers, means for conveying fluids to said chambers, a tapered float connected with said mechanism and adapted to be submerged to a greater or less degree in a liquid by the movement of said mechanism, and an integrating mechanism controlled by the movements of said reciprocating mechanism under control of said float.

3. In a meter, incasing means having mechanism whereby non-communicating compartments are formed, reciprocating mechanism comprising, a tapered displacing device adapted to be submerged in a liquid contained in one of said compartments, said mechanisms being fixed together, pipes connected to said means for conveying fluid lighter than said liquid to opposite sides of said mechanism first named, and integrating mechanism controlled by said reciprocating mechanism acting under control of said displacing device.

4. In a meter, in combination with a conduit, mechanism forming non-communicating fluid compartments, mechanism adapted for reciprocation in one of said compartments, means for differentiating the pressure of fluid flowing in said conduit and communicating the differential pressures to said compartments so as to adjust the position of said reciprocating mechanism by the resultant pressure, a tapered displacing device connected with said reciprocating mechanism and adapted to be submerged in a liquid to a greater or less degree by the movement of said reciprocating mechanism, and an integrating device controlled by the movement of said reciprocating mechanism under control of said displacing device.

5. In a meter, in combination with a conduit, a casing containing reciprocating mechanism dividing it into independent compartments, means for differentiating the pressure of fluid flowing in said conduit and effecting the movement of said reciprocating mechanism by changes in the resultant of the differential pressures, and a tapered displacing device adapted to be submerged in a liquid to a greater or less extent by the movement of said reciprocating mechanism and offering a variable resistance to the movement thereof for effecting the movement of said reciprocating mechanism in a simple ratio to the flow in said conduit.

6. In a meter, in combination with a conduit, reciprocating mechanism comprising a diaphragm, a tapered displacing device adapted to be submerged in a liquid to a greater or less depth by the movement of said reciprocating mechanism and providing a variable force regulating the movement thereof, means for differentiating the pressure of liquid flowing in said conduit and effecting the movement of said reciprocating mechanism by changes in the resultant of the differential pressures, and integrating mechanism comprising a clock and means operated thereby under control of said reciprocating mechanism.

7. In a meter, in combination with a conduit, a casing, mechanism reciprocating in said casing, means for differentiating the pressure of fluid flowing in said conduit and affecting the movement of said reciprocating mechanism by changes in the resultant of the differential pressures, a tapered displacing device adapted to be submerged in a liquid to a greater or less extent by the movement of said reciprocating device and acting to regulate the movement thereof, a rack movable by said reciprocating mechanism, a journaled toothed member operated by said rack, a journaled sheave operated by means of said toothed member, a clock mechanism and means coacting with said clock mechanism and controlled by the position of said sheave for integrating the flow in said conduit.

8. In a meter, reciprocating mechanism, means comprising compartments whereby oppositely acting fluid pressures are communicated to said mechanism, and means separated from the fluid in said compartments by said mechanism, said means translating the movement of said mechanism.

9. In a meter, reciprocating mechanism comprising a pair of heads fixed together, means for communicating fluid pressures to the respective heads, and means separated by said heads from the fluids acting thereon for translating the movement of said heads.

10. In a meter, in combination with a conduit, reciprocating mechanism comprising a diaphragm, means for communicating differential pressures from said conduit to said diaphragm and counter-balancing mechanism comprising a float connected with said diaphragm.

11. In a meter, reciprocating mechanism comprising a bellows diaphragm, means for differentiating fluid pressure and moving said mechanism by the resultant thereof, and counter-balancing mechanism for regulating the movement of said reciprocating mechanism, said counter-balancing mechanism comprising a tapered device and means coacting therewith whereby a liquid is displaced proportionately to changes in said resultant pressure.

12. In a meter, reciprocating mechanism comprising a bellows diaphragm, means for differentiating fluid pressures and moving said mechanism by the resultant thereof, and a counter-balancing float connected with and controlling the movement of said mechanism.

13. In a meter, reciprocating mechanism comprising a pair of connected diaphragms, means comprising compartments for communicating fluid pressures to said diaphragms, indicating mechanism, and means operated by said reciprocating mechanism and separated by said diaphragms from said fluid whereby said indicating mechanism integrates the flow of a liquid to be measured.

14. In a meter, reciprocating mechanism, means for communicating fluid pressure to said mechanism, a tapered float positively fixed to said mechanism, a buoying device fixed to said float, and integrating mechanism connected with said reciprocating mechanism.

15. In a meter, in combination with a conduit, reciprocating mechanism, means comprising fluid compartments for differentiating the pressure of fluid in said conduit and moving said mechanism by the resultant thereof, a tapered float positively fixed to said mechanism, a buoying device fixed to said float, and integrating mechanism connected with said reciprocating mechanism.

16. In a meter, a pair of bellows diaphragms, a float connected with and movable by said diaphragms, means whereby fluid pressure is communicated to said diaphragms and the movement thereof effected under control of said float, and means separated by said diaphragms from said fluid for translating the movement of said mechanism.

17. In a meter, in combination with a conduit, differential pressure mechanism connected with said conduit and operated by fluid pressure communicated therefrom, indicating mechanism, and means from which said pressure mechanism excludes said fluid and through which it communicates its movement to said indicating mechanism.

In witness whereof I have hereunto set my name this 26th day of January, 1910, in the presence of the subscribing witnesses.

JOHN W. LEDOUX.

Witnesses:
ROBERT JAMES EARLEY,
JOS. G. DENNY, Jr.